United States Patent Office 3,486,849
Patented Dec. 30, 1969

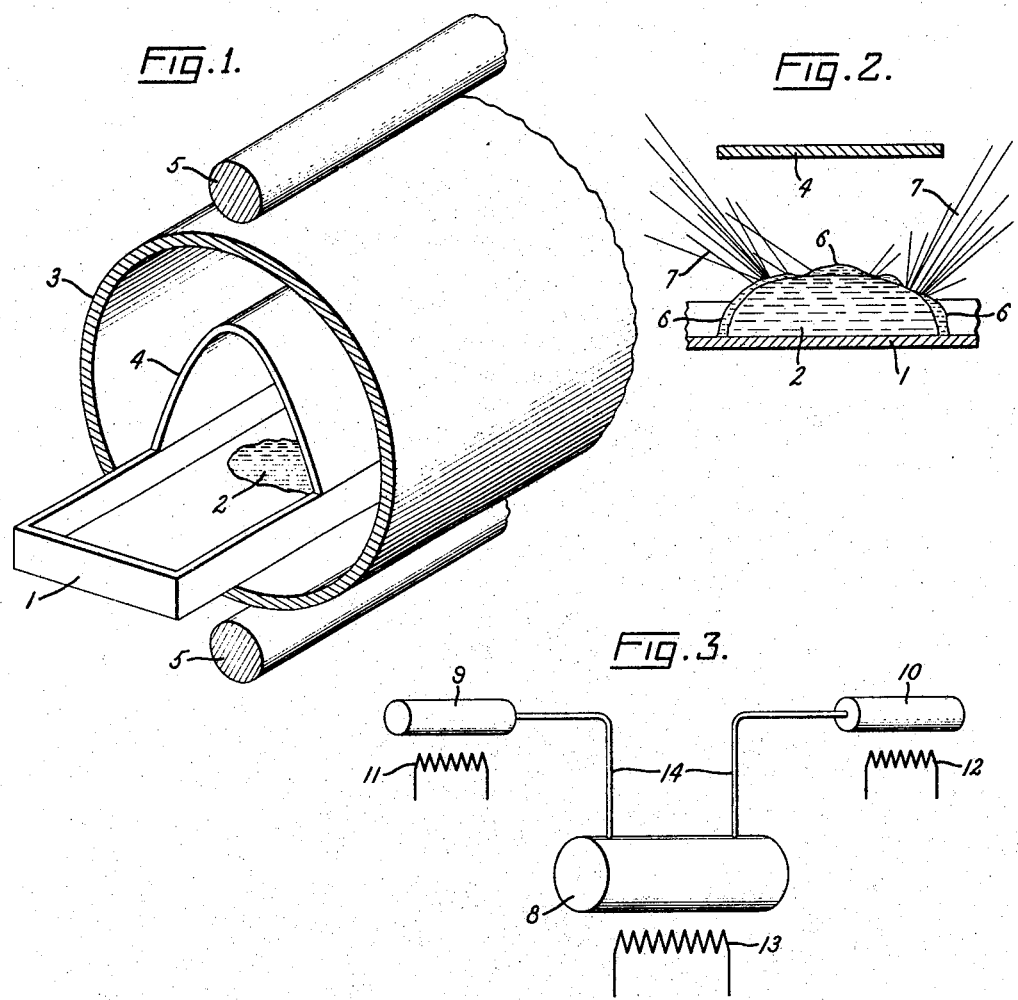
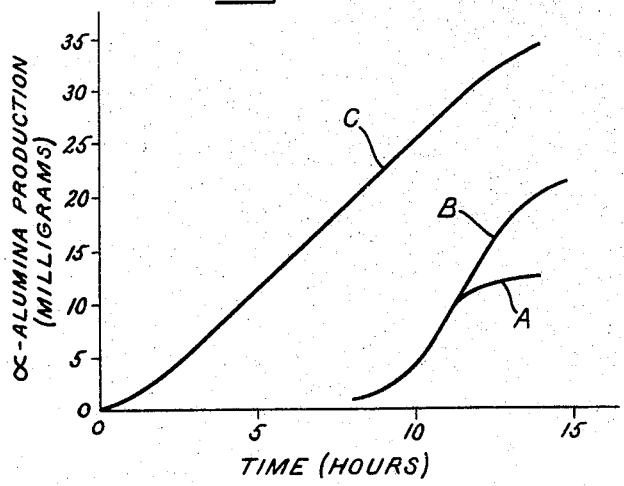

3,486,849
PROCESS FOR PRODUCING ALPHA-ALUMINA WHISKERS
Arno Gatti, Norristown, Pa., assignor to General Electric Company, a corporation of New York
Filed Sept. 20, 1966, Ser. No. 580,448
Int. Cl. C01f 7/02; B01j 17/32
U.S. Cl. 23—142                                    1 Claim

ABSTRACT OF THE DISCLOSURE

The time required for producing α-alumina whiskers is reduced by controlling the localized concentration of reactant vapors in a process wherein aluminum, vaporized in a hydrogen atmosphere, reacts with intermediate reaction products from a silica-containing refractory. Generally the process reaction occurs at about 1300° C. A means for controlling the localized reactant vapor composition may be a physical barrier interposed between the aluminum source and the silica containing refractory or, alternatively, means for heating the silica-containing refractory and the aluminum separately to different temperatures whereby the characteristic vapor pressure of these materials at these respective temperatures controls the concentration thereof in a reaction space remote therefrom.

---

This invention relates to improved processes for producing α-alumina whiskers. More particularly, this invention relates to methods for controlling the speed and efficiency of an α-alumina whisker-producing process.

Alumina whiskers are long, thin, micro-crystals, which have an α-alumina crystalline structure. Because of the high strength and excellent high temperature stability of α-alumina, these whiskers are highly desirable as the reinforcing constituents of composite materials. However, known processes for producing α-alumina whiskers are time-consuming and inefficient in terms of the quantities of desired product and undesired by-product produced in these processes.

For example, it has been known for some time that α-alumina whiskers may be produced by reacting aluminum in a closed chamber with an oxygen-containing refractory material, such as silica, at a temperature above 1300° C. Generally, processes of this type include the placing of an aluminum charge, in a boat comprising pure alumina, silica, etc., into a reaction chamber. Hydrogen or an inert gas is introduced into the reaction chamber and the chamber is raised to a temperature above 1300° C. After a several hour delay, during which alumina debris, i.e. alumina of other than the α-crystalline whisker type, is formed, measurable amounts of α-alumina whiskers begin to form. This delay, or non-productive period preceding the productive period of a typical prior art process, may be as much as two-thirds of the total reaction time.

It is an object of the present invention, therefore, to provide improved processes for the production of α-alumina whiskers.

It is another object of this invention to provide means for controlling the production of α-alumina whiskers and by-product alumina debris in an α-alumina whisker-producing process.

Still another object of this invention is to provide processes wherein α-alumina whiskers are produced more quickly and more efficiently than in those processes heretofore known.

A more specific object of the present invention is to reduce substantially the non-productive period and the amount of debris produced in α-alumina whisker-producing processes.

These and other objects are met, in accordance with the present invention, by the introduction, into an otherwise conventional prior art process of the type described above, of means for limiting the amount of aluminum vapor available to the α-alumina whisker-producing reaction or limiting the localized concentration of aluminum vapor in the vapor phase reaction space. A variety of such means may be used.

For example, one may interpose a physical barrier between the aluminum vapor supply and the oxygen-containing reactant supply.

A second means for accomplishing this result is to heat the aluminum source and the oxygen-containing refractory source separately to preselected temperatures.

It should be noted that combinations of the above methods may also be used, as well as still other methods which may be devised to accomplish the same result.

While this invention is particularly pointed out and distinctly claimed in the subjoined claims of this specification, this invention may be better understood from the following detailed description taken in conjunction with the accompanying illustrations in which:

FIGURE 1 is a partially cut-away view of an apparatus embodying one form of the present invention;

FIGURE 2 is a partial cross-section of a portion of the apparatus shown in FIGURE 1 together with the reactant materials and products which are produced in accordance with the present invention in that apparatus;

FIGURE 3 is a schematic representation of the apparatus used in another embodiment of this invention; and FIGURE 4 is a graph of production versus time for various whisker-producing processes.

Referring more specifically to FIGURE 1, there is shown an alumina boat 1 containing a pool of molten alumina 2. Boat 1 is disposed within a reaction chamber 3, shown in cut-away view, comprising either an oxygen-containing refractory material or a non-reactive material with an oxygen-containing refractory liner. Typically, chamber 3 may be formed of mullite or some other similar siliceous material. In accordance with one aspect of the present invention, the reaction between vapors of an oxygen-containing refractory, such as silica, and aluminum to produce α-alumina whiskers is promoted by the inclusion of a physical barrier 4 partially separating the reactant material vapors thereby limiting the amount of aluminum vapor available to the reaction. Alternately, the function of barrier 4 may be looked upon as limiting the localized concentration of aluminum vapor in the vapor phase reaction space by controlling the passage of aluminum vapor from the molten aluminum 2 into the vapor phase reaction space. In the preferred form of this embodiment of the present invention, barrier 4 is composed of iron. The apparatus shown in FIGURE 1 also includes silicon carbide Globar resistance heaters 5 to heat the apparatus to the desired temperature and a means, not shown, to maintain an atmosphere of hydrogen or some inert gas at ambient pressure, or slightly above, in chamber 3.

FIGURE 2 illustrates the effect of a physical barrier, such as that shown in FIGURE 1, on the disposition of products in the apparatus of FIGURE 1. This is a partial cross-section showing the boat 1, the molten aluminum 2 and the physical barrier 4; in addition, the products of the reaction are also shown. Particularly, there is shown the alumina debris 6 which covers the molten aluminum and the α-alumina whiskers 7 which grow out from the molten aluminum in the general direction of the oxygen-containing refractory vapor source.

The predominant orientation of these whiskers toward the edges of the physical barrier 4, as shown in FIGURE 2, demonstrates that the barrier exerts a definite influence on whisker growth.

Although only one form of apparatus and one type of physical barrier is illustrated it will be appreciated that the apparatus having other geometric configurations may require physical barriers of some other shape or location to effect the same result.

In accordance with another aspect of the present invention an improved $\alpha$-alumina whisker-producing process is provided. One such process utilizes apparatus such as that schematically illustrated in FIGURE 3.

Referring to FIGURE 3, there is depicted a reaction chamber 8 and reactant vaporization chambers 9 and 10. Reactant vaporization chambers 9 and 10 contain, respectively, a source of aluminum and a source of oxygen-containing refractory material, such as silica. Resistance heaters 11, 12, and 13 are provided to cause vaporization of the reactants in the respective vaporization chambers 9 and 10 and to maintain a high temperature in the reaction chamber. Means 14 for transporting the reactant vapors from the vaporization chambers into the reaction chambers are also provided. Although not illustrated, means may also be provided for delivering an inert gas or hydrogen at about ambient pressure or slightly above, through the whisker-producing apparatus schematically illustrated in FIGURE 3. This gas may be passed through the vaporization chambers so as to assist the transport of the reactant vapors into the reaction chamber.

Typically, in a system of this type using aluminum and silica as the reactant materials, the aluminum is heated to about 1200° C. and the silica to about 1500° C. It has been found that the vapor pressures of these materials at these temperatures are such that a desirable proportion of reactant vapors occurs in the main reaction chamber in which the vapors react at a temperature of about 1300° C.

The improved results attained in the present invention may be illustrated by a comparison of typical results of the processes of this invention with those of a prior art process. Referring specifically to FIGURE 4 there is shown Curve A, which represents the relationship between $\alpha$-alumina whisker-production (in milligrams) and time for a typical prior art process utilizing a 50 gram aluminium charge. This relationship was studied in apparatus differing from that illustrated in FIGURE 1 only by the omission of the shield or barrier over the aluminum source. The reaction chamber was a mullite tube having a 2½ inch inside diameter. An alumina boat 8 inches long, 2 inches wide and 1 inch deep was used. It is apparent in this process that significant $\alpha$-alumina whisker production takes place only during the latter few hours of the fifteen hour reaction time. During the long delay period preceding the productive period, alumina debris, i.e. alumina oxide in other than the $\alpha$-alumina whisker form, is produced on the surface of the molten aluminum.

It is now believed that this debris suppresses aluminum vaporization. When sufficient debris has formed to limit the quantity of aluminum vapor available for reaction, $\alpha$-alumina whiskers begin to form. After fifteen hours, a drop-off of whisker production is usually seen in processes of this type. This is attributed to the accumulation of an excess of debris which suppresses aluminum vaporization almost entirely.

Curve B, which is an example of the production versus time relationship observed in experiments identical to those represented by Curve A, except for the addition of the shield or barrier to the boat, demonstrates the significantly increased yields obtainable by the use of such apparatus. In particular, it will be noted that although the delay period, during which debris is apparently formed, is still observed, the physical barrier apparently limits the localized concentration of aluminum vapor available in the reaction space, causing more profuse whisker production and decreased debris formation, once the whisker reaction has started. This in turn, enhances the yield of whiskers by delaying the formation of excessive debris on the surface of the molten aluminum.

Still better results are produced, utilizing the principle of the present invention, by the process schematically illustrated in FIGURE 3. A production versus time curve for this form of the invention is given as Curve C in FIGURE 4. This curve is typical of experiments in which the aluminum is heated to about 1200° C. and the silica to about 1500° C. and these vapors then reacted at about 1300° C. As is apparent from the curve, the delay period in whisker production is effectively eliminated and the overall yield is substantially increased. Since the delay period is generally marked by the formation of alumina debris, the elimination of this delay results in a generally more efficient process with a much greater proportion of aluminum being converted into whiskers and a much smaller proportion being converted to debris. This efficient and virtually instantaneous reaction occurs because the vaporous reactants are in a more favorable ratio for the nucleation and growth of $\alpha$-alumina whiskers.

Thus, the curves shown in FIGURE 4 which are illustrative of the prior art process and the improved process of the present invention, make it clear that there is provided in the present invention, substantially improved methods for the production of $\alpha$-alumina whiskers.

While the present invention has been described with reference to particular embodiments thereof, it will be understood that numerous modifications may be made by those skilled in the art without departing from the true spirit and scope of the invention. Therefore, the appended claim is intended to cover all such equivalent variations as come within the true spirit and scope of the present invention.

What I claim as new and desire to secure by Letters Patent of the United States is:

1. In a process which includes heating aluminum and a silica-containing refractory material whereby vapors of aluminum and silica react in a vapor phase reaction space in an atmosphere consisting of hydrogen and an inert gas to produce alpha-alumina whiskers, the improvement comprising, limiting the localized concentration of aluminum vapor in said reaction space wherein aluminum is heated to a temperature of about 1200° C. to provide said vapors of aluminum, silica is separately heated to about 1500° C. to provide said vapors of silica, and said vapors of aluminum and silica are brought together by a flow of a gas from the group consisting of hydrogen and an inert gas into said reaction space, and reacted in said atmosphere at a temperature of about 1300° C. to produce alpha-alumina whiskers.

References Cited

UNITED STATES PATENTS

| 3,011,870 | 12/1961 | Webb et al. | 23—142 |
| 3,023,115 | 2/1962 | Wainer et al. | 23—142 X |
| 3,077,380 | 2/1963 | Wainer et al. | 23—142 |

FOREIGN PATENTS 608,032  11/1960  Canada.

OSCAR R. VERTIZ, Primary Examiner

G. T. OZAKI, Assistant Examiner